United States Patent [19]

Langé

[11] Patent Number: 4,564,932
[45] Date of Patent: Jan. 14, 1986

[54] METHOD OF FABRICATION OF A PROTECTED OPTICAL DISK AND A DISK OBTAINED BY SAID METHOD

[75] Inventor: Francois Langé, Paris, France

[73] Assignee: Thomson-CSF, Paris, France

[21] Appl. No.: 488,710

[22] Filed: Apr. 26, 1983

[30] Foreign Application Priority Data

Apr. 27, 1982 [FR] France .................................. 82 07251

[51] Int. Cl.⁴ ................................................ G11B 7/26
[52] U.S. Cl. ..................................... 369/286; 156/73.1;
156/308.4; 346/135.1; 346/137; 369/284
[58] Field of Search ............... 369/284, 275, 283, 285,
369/286; 346/135.1, 137; 156/292, 308.4, 73.1

[56] References Cited

U.S. PATENT DOCUMENTS

| | | | |
|---|---|---|---|
| 4,074,282 | 2/1978 | Balas et al. | 346/135.1 |
| 4,164,068 | 8/1979 | Shropshire | 156/73.1 |
| 4,365,258 | 12/1982 | Geyer et al. | 369/284 |
| 4,417,331 | 11/1983 | Takaoka et al. | 369/284 |
| 4,430,659 | 2/1984 | Maffitt et al. | 369/284 |

*Primary Examiner*—Steven L. Stephan
*Attorney, Agent, or Firm*—Cushman, Darby & Cushman

[57] ABSTRACT

A protected optical disk for recording information is fabricated by a method whereby at least one cover is rigidly fixed by a welding to an optical disk having at least one layer of recording material which can be both written and read optically. At least two joints are thus formed by welding, each joint being constituted by at least two weld zones each located respectively within a concentric ring.

8 Claims, 10 Drawing Figures

METHOD OF FABRICATION OF A PROTECTED OPTICAL DISK AND A DISK OBTAINED BY SAID METHOD

FIELD OF THE INVENTION

This invention relates to a method of fabrication of a protected optical disk for recording information which can consist, for example, of video-frequency signals or digital signals.

The invention relates to an information carrier in the form of a disk having at least one optically recordable sensitive layer, said layer being enclosed within a structure which protects it against external agents.

BACKGROUND OF THE INVENTION

In order to obtain high information density on a compact carrier, a known practice consists in utilizing an optical disk provided with at least one layer whose physical characteristics vary as soon as it is exposed to radiation. The information is recorded on said layer by means of a focused light beam in the form of diffracting microelements which can subsequently be detected by means of another focused light beam for reading the information. In order to enable users to perform easy and frequent handling operations, the disk (which may be either prerecorded or blank and which will be commercially available) must be provided with protecting means in order to prevent any influence of dust particles, finger marks and the like on the disk and also in order to guard against any impairment of the radiation-sensitive layer.

Examples of disks of this type are described in French patents No. 2,393,394 and No. 2,355,337 which recommend the use of adhesives for bonding a cover to an information carrier consisting of an optical disk by means of spacers. However, the adhesives must be judiciously chosen, not only as a function of their compatibility with the materials of the subtrates and of the sensitive layer but also as a function of their strength and ease of utilization. Furthermore, the process of bonding with adhesives is neither well suited to large-scale production nor conducive to a high standard of reliability.

A more suitable method consists in assembling the components by welding with heating and melting of part of the material of the components to be assembled, with or without an additive substance. Disks of thermoplastic material are particularly well suited to this method. The different known methods of welding of thermoplastics can be contemplated such as, for example, methods which make use of heating blades, friction, high-frequency electric fields, laser beams and ultrasonic waves. The ultrasonic welding technique is particularly well suited to optical disks inasmuch as the very localized heating of very short duration limits the risks of damage to the sensitive layer in the vicinity of a weld fillet or raised ring-shaped zone to be welded.

However, many disks obtained by welding have a deformation of convex shape which is liable in some instances to attain several millimeters. One reason for this phenomenon lies in the thermal shrinkage or contraction at the time of cooling of the weld-fillet material after heating of this latter in order to form the weld and subsequent solidification. During cooling of the weld fillet from the solidification temperature to room temperature, shrinkage of the fillet in fact takes place and this latter compresses the disk in much the same manner as a binding hoop. Furthermore, the disk constitutes a thin structure and, if this compression exceeds a critical value, it produces a buckling stress or curvature of the disk and subsequent deformation.

SUMMARY OF THE INVENTION

The object of the invention is to overcome these disadvantages by providing protected optical disks in which assembly of all or part of the components is performed by welding and in which deformations are reduced to acceptable values.

This object is achieved by replacing the weld fillet by two or more parallel and closely-spaced ribs having smaller dimensions than those of the single fillet which are replaced by said ribs.

The invention is directed to a method of fabrication of a protected optical disk comprising:

a first step which consists in forming a circular flat information carrier of thermoplastic material comprising an annular recording zone having the same axis of symmetry as that of the carrier and at least one protective cover of thermoplastic material, said information carrier and each cover being provided with zones which are intended to be welded together, the zones located on said information carrier being located on each side of the recording zone;

a second step which consists in positioning each protective cover with respect to said information carrier along the same axis of symmetry as that of said carrier in order to delimit at least one annular chamber located above a recording zone;

a third step which consists in heating the zones to be welded together, said zones being located on said information carrier and on each protective cover; this step is followed by a step which consists in rigidly fixing said information carrier to each protective cover by forming welded joints which include the zones to be welded after welding of said joints, at least two joints being so arranged as to delimit an annular chamber located above the recording zone.

The distinct feature of the invention lies in the fact that, during the third step, each joint is formed by at least two weld zones between said information carrier and a protective cover, said zones being located respectively within concentric rings spaced at a distance within the range of 0.4 to 6 millimeters.

The invention is also directed to a protected optical disk obtained by means of the method outlined in the foregoing.

BRIEF DESCRIPTION OF THE DRAWINGS

Other features of the invention will be more apparent on consideration of the following description and accompanying drawings, wherein.

DETAILED DESCRIPTION OF THE INVENTION

These different figures are partial illustrations of said protected optical disk; the whole disk could be obtained as a result of a symmetrical arrangement of the disk with respect to the axis of rotation Δ.

Figure 1:
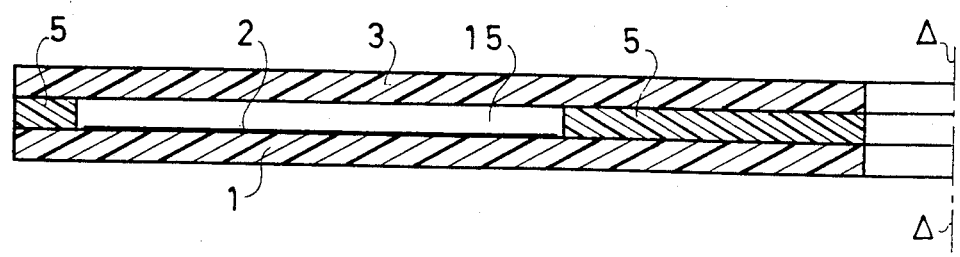
FIGS. 1 to 4 illustrate protected disks in accordance with the prior art.
Figure 2:
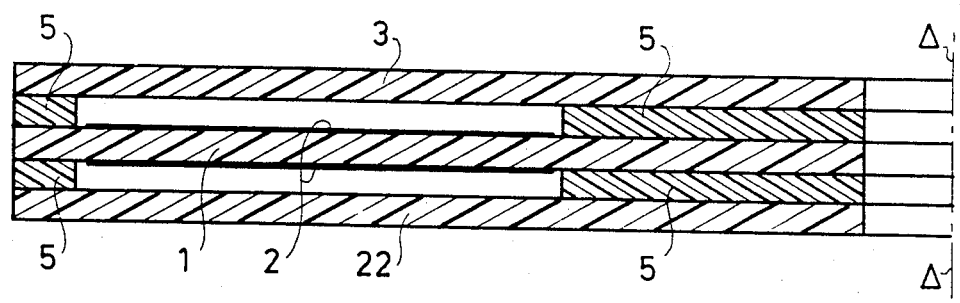

Two examples of protected optical disks of the prior art are illustrated in FIGS. 1 and 2. Said disks have been obtained by means of a method of fabrication of said protected optical disk by rigidly fixing at least one cover 3 (22) to a flat circular information carrier which will hereafter be designated as an "optical disk" 1 by means of spacer members 5, these different elements having been bonded to each other. Recording and reading of information are performed on a sensitive layer 2 deposited on an information carrier 1 in the form of a disk by means of radiation beam which passes either through the carrier 1 or through the cover 3. Said sensitive layer 2 is located within the protected space delimited by the carrier 1 and the cover 3.

FIG. 2 illustrates one type of double-face disk comprising an information carrier 1 located between two covers 3 and 22. Information carriers and covers are secured in rigidly fixed relation by means of circular spacer members 5 which maintain the requisite distance between cover and carrier while ensuring both airtightness and rigidity of the assembly. Said spacer members can also form an integral part of either the carrier or the cover. Inexpensive parts can be made, for example, of injected plastic material.

Another method of fabrication of a protected optical disk consists in assembling the parts by welding, with heating and melting of part of the material of the components to be assembled, with or without an additive substance by employing disks of thermoplastic material, for example. Different known methods of welding of thermoplastics already exist such as, for example, methods involving the use of heating-blades, friction, high-frequency electric fields, laser beams and ultrasonic waves. The ultrasonic welding technique is particularly well-suited to optical disks. The very localized heating of very short duration limits the potential danger of damage to the sensitive layer in the vicinity of the weld fillet or raised ring-shaped moulding which permits formation of a welded joint. Said raised moulding already exists prior to welding on one of the elements to be rigidly fixed.

Figure 3:
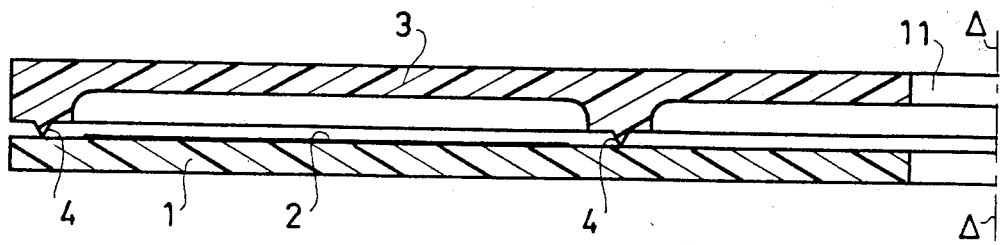

FIG. 3 shows one example of a flat circular information carrier 1 and a cover 3 for ultrasonic welding in accordance with a technique of the prior art. The cover 3 is hollowed-out opposite to the cut zone 2 of the information carrier 1 and is supported on the carrier 1 by means of pointed circular ribs 4. The cover 3 as well as the pointed ribs 4 formed on the carrier 1 and accordingly the disk which forms the information carrier are of thermoplastic material or in other words soften under the action of heat and subsequently solidify, thus making it possible to form a welded joint. The aforementioned pointed ribs serve to concentrate the ultrasonic energy which results in melting of these latter as well as the material of the information carrier in the immediate vicinity of a pointed rib.

Figure 4:
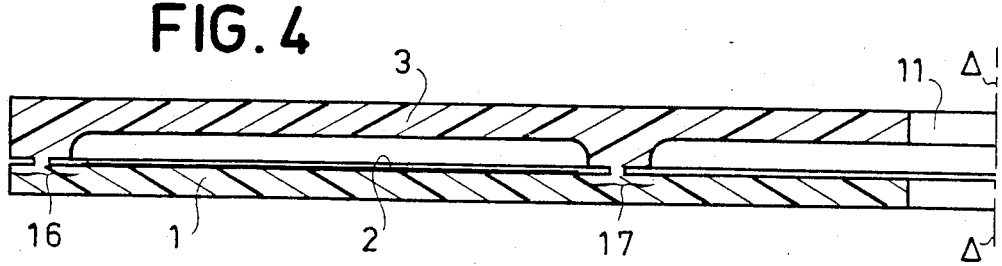

FIG. 4 illustrates the protected disk after welding. Usual dimensions of the pointed ribs can be within the range of 0.3 to 1 millimeter in height and within the range of 0.4 to 1.3 millimeter in width.

The method in accordance with the invention consists in forming protected optical disks in which the assembly of all or part of the components is carried out by welding and in which deformations of the disk are reduced to acceptable values.

This objective is achieved by employing for example in the case of an ultrasonic weld a plurality of parallel and closely spaced weld fillets having smaller dimensions than the necessary dimension of the weld fillet when this latter is employed alone.

Throughout the description which now follows, consideration will be given to a flat circular information carrier 1 which will hereafter be designated as an optical disk 1, and a cover 3 of thermoplastic material which can consist for example of polymethyl methacrylate (PMMA) and therefore permits welding.

There is in fact employed a disk of thermoplastic material which becomes weldable after softening as a result of an increase in temperature. In the method according to the invention, the disk 1 and the protective cover 3 are joined together by means of a plurality of spot welds, thus making it possible to melt a smaller quantity of material for the same strength of junction.

The optical disk 1 under consideration is a rigid disk while the cover 3 can be either rigid or partly or completely flexible. The cover 3 or the disk 1 or both are transparent to light radiation.

A method of preferential welding in accordance with the invention consists in the use of the ultrasonic welding technique. To this end, the cover 3 or possibly the optical disk 1 is provided on its surface with ring-shaped molded ribs which are first heated and subsequently softened, whereupon they are placed in contact with the other component, thereby permitting the formation of a joint by welding.

Said molded ribs can have a pointed shape, in which case the ultrasonic welding process is more effective.

However, other methods can also be adopted such as friction welding of the two components consisting of disk 1 and protective cover 3 or a method involving the use of a heating blade.

In the present invention, consideration is no longer given to a single weld fillet of substantial width but to a number of small parallel weld fillets.

Another alternative possibility consists of laser welding, in which the laser beam need only be focused on the annular portion to be welded in order to heat this latter. In the case of high-frequency welding, it is only necessary to position the portion to be welded between two electrodes and thus to form a weld by heating. In both of these instances, there is no need for weld fillets. It is merely necessary to form concentric annular welds in closely spaced relation.

Whatever method may be considered, two joints are therefore formed on each side of the annular zone which carries the photosensitive layer for recording information thereon. Each joint has at least two concentric annular weld zones which are close to each other and may or may not be continuous. The welded zones have a width of 0.3 millimeters, for example, and the distance between two welded zones of the same joint is within the range of 0.4 to 6 millimeters.

If consideration is given to joints formed by uninterrupted weld zones located on the periphery of the optical disk and at its center, this accordingly has the effect of forming air-tight joints for closing the annular cavity located above that portion of the optical disk 1 which is covered with the sensitive layer 2.

In the majority of welding processes, the thickness of the molten zone increases the width of the joint whereas its strength is approximately proportional to its width. Thus the replacement of a single annular weld zone of substantial width by a plurality of annular weld zones of smaller size results in equivalent strength in respect of a smaller quantity of molten material. For example in the case of ultrasonic welding, the replacement of one weld fillet measuring 1 millimeter × 1 millimeter by two fillets measuring 0.5 millimeter × 0.5 millimeter has the effect of reducing the cross-section of molten material from 1 square millimeter to 0.5 square millimeter. In point of fact, the peripheral tangential force which is a cause of compression of the disk is directly proportional to the cross-section of molten material.

Furthermore, the relative rotation of the two components (disk 1 and cover 3) about the axis of a single weld zone produces only a torque of low intensity by reason of the small width of said weld zone. On the contrary, in the case of a double joint, for example, the torque which is opposed to rotation is equal to the product of the force on the weld zone at right angles to the plane of the disk times the distance between the two weld zones. Said torque is therefore of appreciably higher value than is the case with a single weld zone in which the connection between the two components (disk 1 and cover 3) can be compared with an articulation. In the case of the double joint, the connection can be compared with a clamping joint and the structure is accordingly of much greater rigidity and the deformations are much smaller.

As a secondary feature, the increase in number of annular weld zones provided by each joint between disk 1 and cover 3 achieves enhanced reliability of airtightness.

If consideration is given to the example of the ultrasonic welding process, said molded ribs formed prior to welding become weld fillets after welding and are formed of the same material as the cover 3 (or the optical disk 1), said disk 1 or cover 3 can be formed by machining or by injection of material into a mold.

The disk 1 and the cover 3 have the same dimensions such as, for example, 305 millimeters in diameter and 1.5 millimeters in thickness.

The molded ribs are integral with the component but disappear at the time of welding so as to form weld fillets.

In the description which now follows, a welding process of the ultrasonic type will be considered without thereby implying any limitation since examples of devices obtained by this method could be produced just as readily by resorting to the use of other welding processes.

Figure 5:
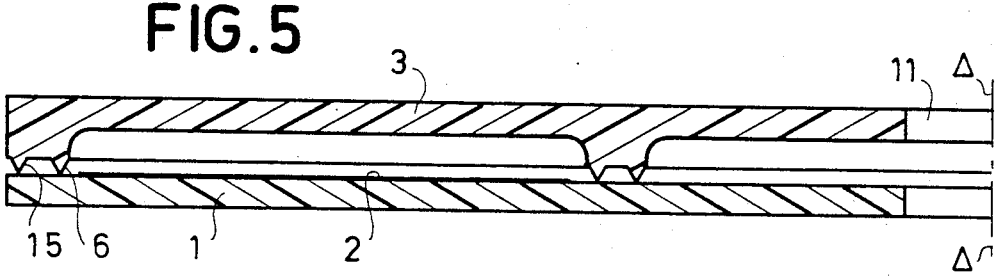
FIGS. 5 and 6 illustrate the method of fabrication of the protected optical disk in accordance with the invention.

FIG. 5 shows one example of disk 1 and of cover 3 in accordance with the method of the invention with reference to the non-limitative example of ultrasonic welding. The single pointed rib 4 of the preceding embodiment has been replaced by two smaller pointed ribs 15 and 6. In order to obtain a higher degree of rigidity, however, it is an advantageous to increase the spacing between the pointed ribs 15 and 6. Good results have been obtained on substrates and covers of polymethyl methacrylate (PMMA) having a diameter of 305 millimeters and a thickness of 1.5 millimeters with points having a height of 0.3 millimeters, a width of 0.3 millimeters and a relative spacing of 3.8 millimeters. Advantageous dimensions of the points are within the range of 0.15 and 0.45 millimeters both in width and in thickness.

Figure 6:
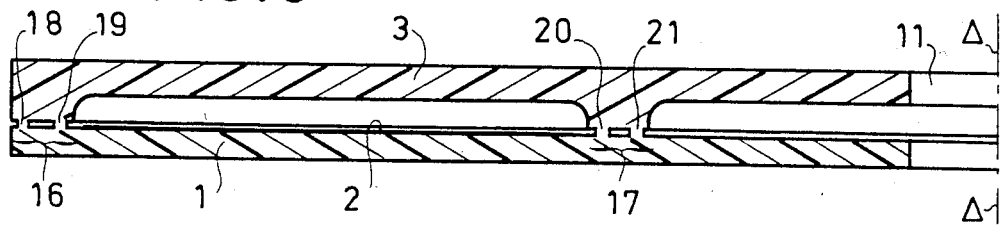

The largest pointed ribs result in joints of greater width and strength but call for higher welding power and are attended by a higher potential danger of deformation. Pointed ribs of excessively small size require highly accurate production of components and the quality of the weld becomes very sensitive to deviations from parallel alignment. FIG. 6 shows the same components after welding.

In FIG. 6, the real initial state of the cover 3 and the disk 1 is such that they are not completely juxtaposed, whereas it must be endeavored in actual practice to bring them together as intimately as possible.

The two joints 16 and 17 which permit a rigid connection between the disk 1 and the cover 3 are shown in FIG. 6 with the corresponding weld rings 18, 19 and 20, 21.

Figure 7:
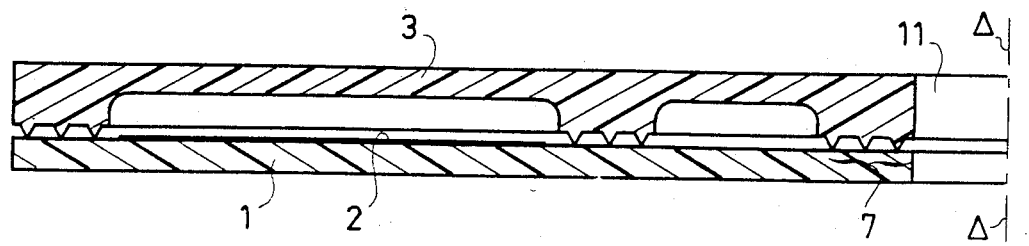
FIGS. 7 to 9 illustrate alternative embodiments of the device obtained by means of the method in accordance with the invention.

FIG. 7 illustrates an alternative embodiment of the invention with welds consisting of three parallel fillets. In addition, a third joint 7 has been added around the centering hole 11 of the disk 1, thus endowing the protected disk with additional rigidity and therefore reducing deformations. In this case, the disk 1 has a more simple shape than the protective cover 3.

Figure 8:
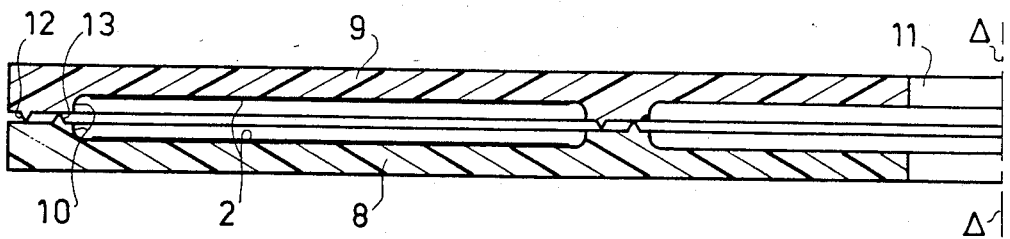
Figure 10:
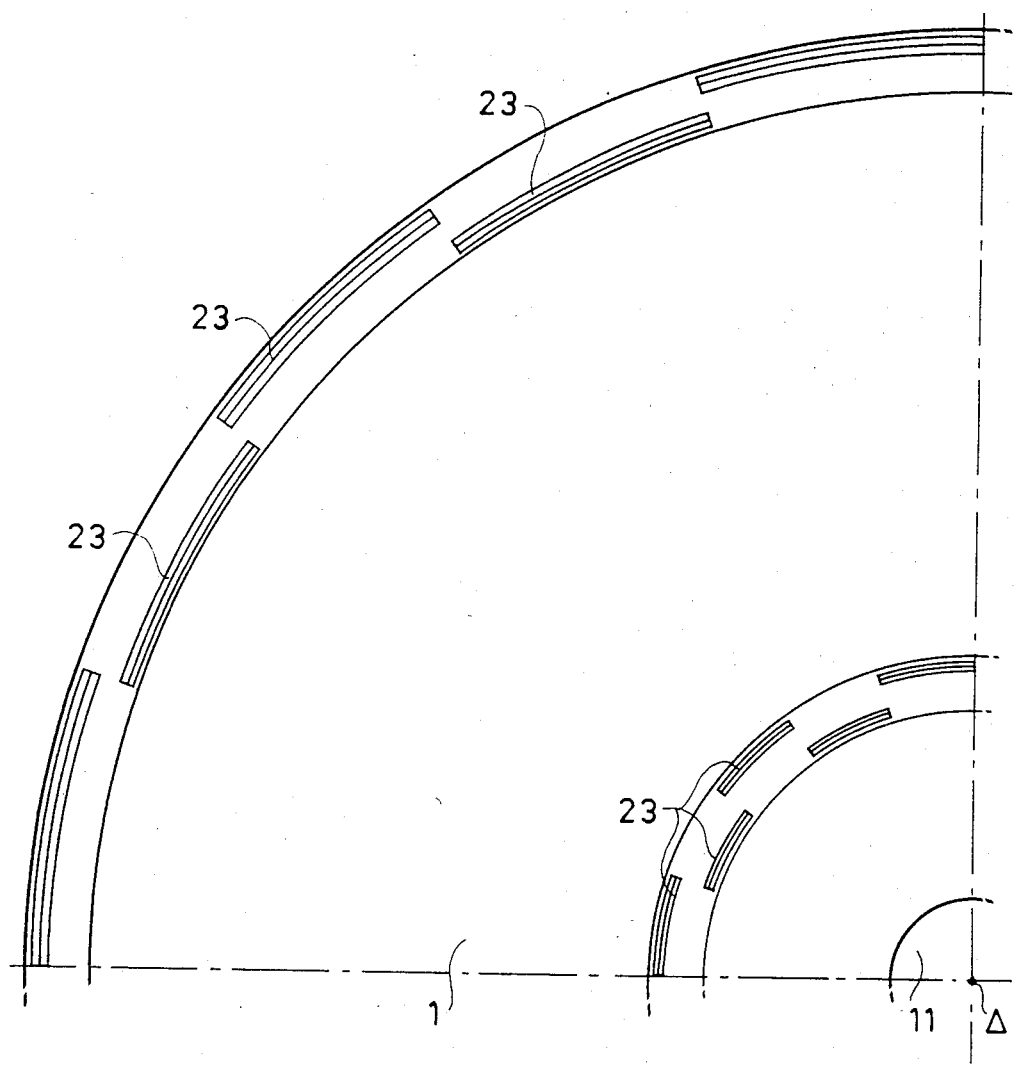
FIG. 10 illustrates a particular aspect of the device obtained by means of the method in accordance with the invention.

FIG. 8 illustrates yet another alternative embodiment of the invention in the form of a double-face disk. Each substrate 8 and 9 is provided with bearing portions 10 having thicknesses equal to one-half the requisite distance between the internal faces of the substrates 8 and 9 which can each carry a sensitive layer 2. The external pointed ribs 12 can be carried by the substrate 9 and the internal pointed ribs 13 can be carried by the substrate 8 as shown in FIG. 8, thus ensuring symmetry of the structure thus obtained. The pointed ribs can also be divided into sectors of equal length carried alternately by the substrates 8 and 9 as shown in FIG. 10, with the result that the pointed sectors of the substrate 8 are brought into engagement within the ribless sectors of the substrate 9 and conversely. In this manner, the structure is perfectly symmetrical, the members 8 and 9 are identical and, if necessary, can be poured or injected into the same mold. FIG. 10 shows the disk 1 together with the molded ribs 23 but the cover 3 has the same configuration.

In FIG. 8, welding is performed in the mid-plane of the protected optical disk, the two components having been formed for example by injection into a mold. A high degree of mechanical strength is thus obtained.

In FIG. 10, the two components consisting of disk and cover are fabricated from the same mold and can be engaged one inside the other.

Figure 9:
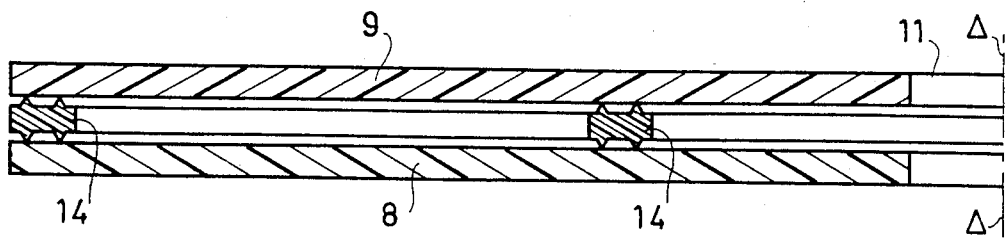

FIG. 9 illustrates still a further alternative embodiment of a double-face disk in which the substrates 8 and 9 can be obtained by cutting from plates without any need for subsequent machining by making use of spacer members 14. As shown by way of example in FIG. 9, said spacer members can have the shape of rings on which pointed ribs are formed. In addition, these spacer members must be formed of thermoplastic material.

In all the figures, the pointed ribs are represented in an ideal triangular cross-sectional shape. However, this shape could also be rounded, trapezoidal or even square, depending on the methods and difficulties of construction. The constructional examples proposed are also applicable to the case of the structure consisting of one substrate and two covers as illustrated in FIG. 2.

What is claimed is:

1. A protected optical disk comprising a protective casing of thermoplastic material, annular optically recordable structure enclosed in said casing; said casing being made of at least first and a second disk shaped member delimiting an annular chamber and assembled to each other with welded circular joints; said first disk shaped member having an annular recess in confronting relationship with said recordable structure and two ring shaped raised portions respectively inwardly and outwardly bounding said annular recess; said second disk shaped member mating said raised portions; said welded circular joints extending between said second disk shaped member and said ring shaped raised portions for sealing said casing; at least first and second of said welded circular joints being spaced and concentrically arranged on one side of the inner and outer sides of said annular recess; one of said disk shaped members having an inner flat face supporting said recordable structure; the radial spacing of said first and second welded circular joints lying in a range from 0.4 to 6 millimeters.

2. A disk as in claim 1 wherein three welded circular joints are spaced and concentrically arranged on said one side of said annular recess.

3. A disk as in claim 1 wherein said second disk shaped member has raised portions mating with said raised portions of said first disk shaped member.

4. A disk as in claim 1 wherein said raised portions are formed by spacer rings.

5. A disk as in claim 1 wherein said first and second welded circular joints extend alternately in sectors.

6. A disk as in claim 1, wherein a further annular optically recordable structure is enclosed in said casing; said recordable structure and said further recordable structure being respectively supported by inner flat faces of said first and second disk shaped members.

7. A disk as in claim 1, wherein said first and second disk shaped members are fabricated from polymethyl methacrylate.

8. A disk as in claim 1, wherein at least one of said disk shaped members is made of a transparent themoplastic material.

* * * * *